(12) United States Patent
Christie et al.

(10) Patent No.: US 10,844,908 B2
(45) Date of Patent: Nov. 24, 2020

(54) CONCENTRATED HIGH-SPEED RIGID HUB

(71) Applicant: PRESCRIPTION TILLAGE TECHNOLOGY, LLC, Clarinda, IA (US)

(72) Inventors: Richard L. Christie, Clarinda, IA (US); Ryan J. K. Christie, Clarinda, IA (US); John D. Nance, Ringoes, NJ (US)

(73) Assignee: Prescription Tillage Technology, LLC, Clarinda, IA (US)

( * ) Notice: Subject to any disclaimer, the term of this patent is extended or adjusted under 35 U.S.C. 154(b) by 0 days.

(21) Appl. No.: 16/162,687

(22) Filed: Oct. 17, 2018

(65) Prior Publication Data

US 2019/0120296 A1  Apr. 25, 2019

Related U.S. Application Data

(60) Provisional application No. 62/574,365, filed on Oct. 19, 2017.

(51) Int. Cl.
*A01B 23/00* (2006.01)
*A01B 23/06* (2006.01)
(Continued)

(52) U.S. Cl.
CPC ............ *F16D 1/076* (2013.01); *A01B 15/18* (2013.01); *A01B 23/06* (2013.01); *A01B 71/04* (2013.01); *F16C 19/18* (2013.01); *F16C 33/32* (2013.01); *F16C 33/3887* (2013.01); *F16C 19/54* (2013.01); *F16C 35/06* (2013.01); *F16C 2300/22* (2013.01); *F16C 2300/32* (2013.01); *F16C 2310/00* (2013.01); *F16D 2200/0021* (2013.01)

(58) Field of Classification Search
CPC ......... A01B 15/16; A01B 15/18; A01B 23/06; A01B 71/04; B60B 27/02; B60B 27/0052; F16C 19/084; F16C 19/18; F16C 33/78; F16C 33/32; F16C 33/3887; F16D 1/076; F16D 65/123; F16D 65/847; F16D 65/128
USPC ........ 172/604, 518, 681; 111/163, 167, 192; 188/218 XL, 218 R; 301/6.1, 6.3, 6.5, 301/6.8, 105.1, 35.621
See application file for complete search history.

(56) References Cited

U.S. PATENT DOCUMENTS 1,584,616 A * 5/1926 Cothran ................. A01B 23/06
                                                      384/460
2,349,220 A * 5/1944 Eksergian ............... B60B 27/02
                                                      301/105.1
(Continued)

*Primary Examiner* — Robert E Pezzuto
(74) *Attorney, Agent, or Firm* — Suiter Swantz pc llo

(57) ABSTRACT

A concentrated high-speed rigid hub allows for heavier planters, high-speed planting and seeding devices in multiple and multiple challenging applications such as no-till, high cation exchange capacity (CEC) soils, compact soils, moist soils, high concentrations of stubble and or *Bacillus thuringiensis* (Bt) crops, and cover or green crops with massive structured root systems. The hub is made of one of high strength forging steel and medium carbon cast steel, whereby the hub lessons hub flexing, hub bending, cracking and premature failure. The hub comprises rigid, heavy duty deep bosses or gussets which increase structural strength and maximize the strength of attachment points adapted for either bolts or rivets attachment to a blade or object.

23 Claims, 7 Drawing Sheets

(51) Int. Cl.
*F16D 1/076* (2006.01)
*A01B 71/04* (2006.01)
*A01B 15/18* (2006.01)
*F16C 19/18* (2006.01)
*F16C 33/38* (2006.01)
*F16C 33/32* (2006.01)
*F16C 19/54* (2006.01)
*F16C 35/06* (2006.01)

(56) References Cited

U.S. PATENT DOCUMENTS

| | | | | |
|---|---|---|---|---|
| 2,783,103 | A * | 2/1957 | Hamilton | A01B 15/16 |
| | | | | 384/460 |
| 4,425,004 | A * | 1/1984 | Carmichael | B23P 6/04 |
| | | | | 29/894.34 |
| 5,492,391 | A * | 2/1996 | Snook | B60B 1/042 |
| | | | | 301/105.1 |
| 7,111,911 | B2 * | 9/2006 | Baumgartner | F16D 65/123 |
| | | | | 188/218 XL |
| 7,475,738 | B2 * | 1/2009 | Frasier | A01B 71/04 |
| | | | | 111/140 |
| 7,648,284 | B2 * | 1/2010 | Norimatsu | B60B 27/00 |
| | | | | 384/544 |
| D776,038 | S * | 1/2017 | Hensel | D12/207 |
| 9,538,697 | B2 * | 1/2017 | Ciulla | A01B 71/04 |
| 2014/0216313 | A1 * | 8/2014 | Bassett | A01B 49/06 |
| | | | | 111/139 |
| 2016/0025165 | A1 * | 1/2016 | Plantan | F16D 65/123 |
| | | | | 188/218 XL |

* cited by examiner

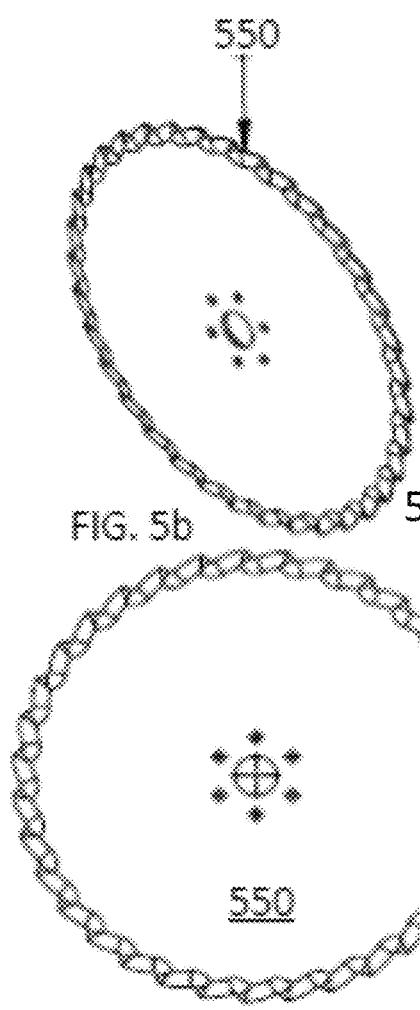
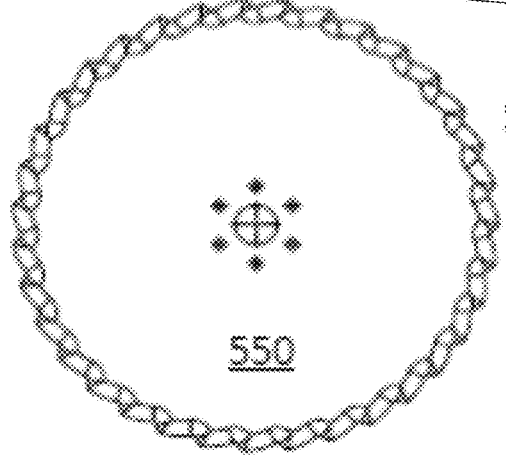
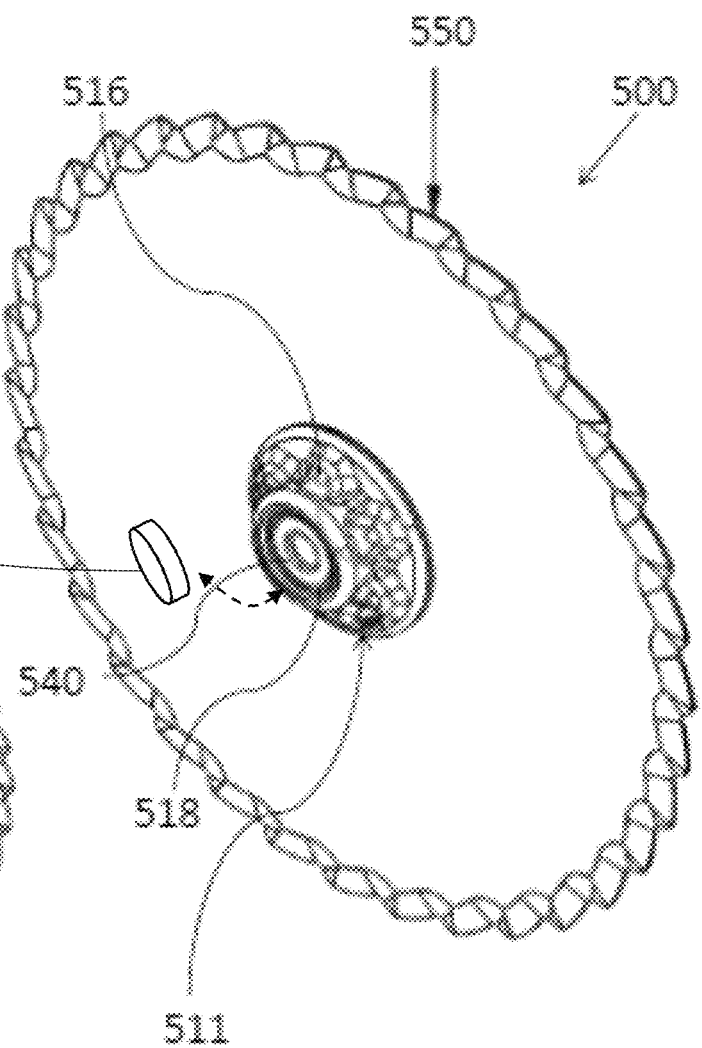
FIG. 5a
FIG. 5b
FIG. 5c

CONCENTRATED HIGH-SPEED RIGID HUB

This application claims the benefit of U.S Provision Application No. 62/574,365 filed Oct. 19, 2017, the subject matter of which is hereby incorporation in its entirety by reference thereto.

FIELD OF THE INVENTION

The present invention relates generally to agriculture tillage equipment; more particularly, to a hub and hub assembly especially for use with a coulter blade.

DESCRIPTION OF THE PRIOR ART

Traditional agriculture requires turning of the soil to effectively bury desirable stubble and create needed composted material. With the advent of reduced tillage and minimum tillage farming techniques, coulter blades may be used to increase surface area by cutting and reducing the stubble to a manageable condition, thereby enabling compost and reuse of the desirable stubble.

Mounting of coulter blades on tillage equipment is typically accomplished through hub assemblies. Standard hubs are made of pressed steel or cast, which were designed for full-till operations with minimum loads and impact requirements. Accordingly, traditional hubs do not allow for heavy planters, high-speed planting and seeding devices in multiple and multiple challenging applications such as no-till, moist *Bacillus thuringiensis* (Bt) stubble, high concentrations of stubble, high cation exchange capacity (CEC) soils, compact soils, cover and green crops with massive structured root systems, new heavy down pressure systems actuated hydraulically or by air. As a result, standard hubs lack longevity and must be replaced after minimum use. Hub replacement not only results in purchasing replacement hubs. It also results in downtime that creates operational losses.

Frequently the blade to hub and hub to outer bearing race contact area of typical hub assemblies is minimal. This oftentimes creates bearing flex, blade flex, blade out of round, blade wobble [common in the industry with pressed steel hubs that are press riveted] and paired blades contact or friction, which contribute to premature blade failure.

Current hubs do not generally provide for absorption of forces and stability and therefore agricultural implements, i.e., coulter blades, for example, are subject to breaking. Additionally, currently utilized bearings utilized in hub to bearing outer race contact fails to provide maximum contact at the bearing-hub to interface, and therefore bearings and Hubs are prone to loosening. This loosening causes wobbling of assembly at stress points, including the bearing hub loads and bearing hub to blade loads, causing breakage of the blade (twisting redirecting forces), breakage of bearings, and/or breakage of the hub. As the hub loosens on the bearing and allows the blade to start wobbling, even at 0.025 inch increments, there is an increase in pressure on the bearing causing flexing translating to damage to the bearing, blade and/or hub.

Typically, agricultural professionals cannot simply replace a damaged bearing and/or hub because of wear patterns making it difficult for proper compression contact with the replacement hub and/or bearing, resulting in loosing and/or wobbling during use, and ultimately breakage again. Consequently, when damage results generally a whole new blade, hub and bearing assembly must be purchased to replace the damaged assembly. These problems in the art concerning hub to bearing to blade assemblies in the agricultural field currently result in the need for roughly two dozen sets of blade roller bearing-hub assembly replacements for the life of the agricultural machinery, such as planters. Blade assembly costs compounded by labor and lost operating time cost agricultural professionals thousands of dollars.

Therefore, there exists a need in the art for a hub that provides a hub that improves blade bearing hub assemblies making them more durable and reliable, thereby saving costs. Particularly, there exists a need in the art for a hub that facilitates maximum blade to bearing contact area and maximum blade to hub contact area producing hub and blade longevity. Further, there exists a need for a hub designed to allow for heavier planters, high speed planting and seeding devices in multiple and multiple challenging applications such as no-till, high CEC soils, compact soils, moist soils, high concentrations of stubble and/or Bt crops, and cover or green crops with massive structured root systems.

SUMMARY OF THE INVENTION

The present invention provides a concentrated high speed rigid hub (CHRH) for heavier planters, high speed planting and seeding devices in multiple and multiple challenging applications such as no-till, high CEC soils, compact soils, moist soils, high concentrations of stubble and/or Bt crops, and cover or green crops with massive structured root systems.

The hub is made of one of high strength forging steel and medium carbon cast steel, whereby the hub lessons hub flexing, hub bending, cracking and premature failure. The hub comprises rigid, heavy duty deep bosses or gussets, whereby the bosses or gussets increase structural strength and maximize the strength of attachment points operative to connect either bolts or rivets other appropriate fasteners to a blade or object.

Absorption of forces is provided for by way of the subject CHRH. It has been found that the subject CHRH construction made from high strength forging steel and/or medium carbon cast steel, thicker more compact construction with greater hub to bearing contact area and greater hub to blade contact are results in optimal absorption of forces throughout the blade hub bearing assembly. As constructed, the subject CHRH's increased contact area interface prevents stress loads on the components (blade, hub and/or bearing) that loosen one or more components and thereby the CHRH prevents wobbling and ultimately breakage. Unlike current hub constructs, the CHRH hub is not prone to loosening and is capable of handling flex forces and stress with repeated use. As a result, instead of several blade hub bearing assemblies being necessary for the life of the agricultural equipment, only two to three sets of assemblies are found needed. This saves agricultural professionals thousands of dollars in parts, replacement labor, and downtime.

An embodiment of the present invention is directed to a concentrated high-speed rigid hub made of one of high strength forging steel and medium carbon cast steel, whereby said hub lessons hub flexing, hub bending, cracking and premature failure. Inasmuch as these forces are transferred from the blade to the hub, commensurate lessening effects are realized during blade operation. The hub may comprise heavy duty deep bosses or gussets, whereby said bosses or gussets increase structural strength and maximize the strength of attachment points adapted to connect either bolts or rivets or fasteners attachment to a blade or object.

An additional embodiment of the present invention is directed to the hub, which further comprises a narrow circumferential side wall abutting and perpendicular to an outer hub rim that, in turn, abuts a hub top wall. The top wall includes rigid, heavy duty deep bosses or gussets having cast, cast steel or forged steel threaded apertures adapted for receiving bolts and having a thickness depth greater than a thickness depth of said side wall and hub rim. The rigid, heavy duty deep bosses or gussets abut an inner hub rim. The inner hub rim forms a bearing housing adapted to receive a double or single roller bearing therein, which enables the hub to provide a maximum blade and bearing contact area, in a concentrated size, configured for maximum soil depth.

BRIEF DESCRIPTION OF THE DRAWINGS

The invention will be more fully understood and further advantages will become apparent when reference is had to the following detailed description of the preferred embodiments of the invention and the accompanying drawing, in which:

FIG. 3b is top plan view of the heavy-duty double roller bearing of FIG. 3a;

FIG. 4b is a side view of the fastener, taper bolt, of FIG. 4a;

FIG. 5a is a top side view of a coulter blade, STP opener blade left side, exemplary of an embodiment for use with the hub of the present invention;

FIG. 5b is a top view of the coulter blade of FIG. 5a;

FIG. 5c is a top side view of the full assembly depicting an exemplary embodiment of the hub of the present invention mounted on the coulter blade of FIG. 5a;

FIG. 6b is a side plan view of the hub of FIG. 6a;

FIG. 6c is a back-side plan view of the hub of FIG. 6a;

DESCRIPTION OF THE PREFERRED EMBODIMENTS

Figure 1:
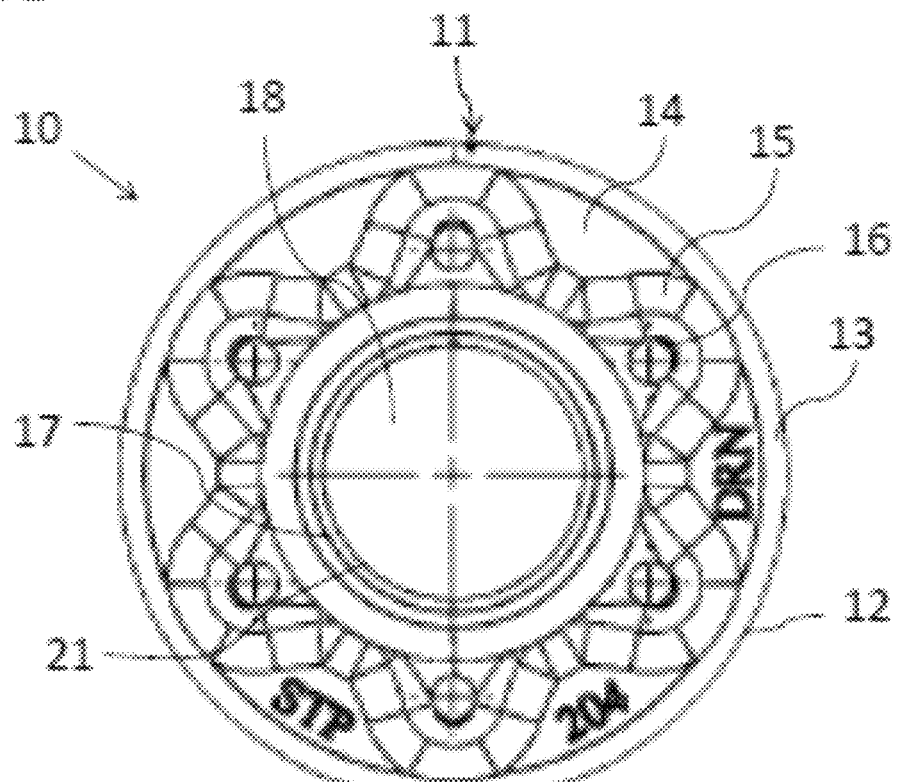
FIG. 1 is a top plan view of a hub exemplary of an embodiment of the present invention.

Reference will now be made in detail to the presently preferred embodiments of the invention, examples of which are illustrated in the accompanying drawings. The subject coulter blade hub or concentrated high-speed rigid hub (CHRH) shall be referred to throughout as the CHRH, or the subject coulter blade hub.

The following description presents certain specific embodiments of the present invention. However, the present invention may be embodied in a multitude of different ways, as defined by the subjoined claims. In this description, reference is made to the drawings wherein like parts are designated with like numerals throughout.

The subject CHRH provides a rigid, heavy-duty hub having deep bosses or gussets, maximum blade and bearing outer race contact area, in a concentrated size, configured for maximum seeding depth without depth wheel or arm contact. The subject hub also lessens or stops bearing flex, blade flex, blade out of round, blade wobble [which is common in the industry with pressed steel hubs that are press riveted] and paired blades contact or friction that cause premature blade failure. Increase fastener contact area is also provided by the subject hub, preventing rivet or bolt stretch, rivet or bolt cutting and hub to blade flex or loosening effect. Owing to the enhanced contact area interfaces—both at the blade-hub back surface and the hub-bearing outer race surface area absorption of forces over the entire assembly are absorbed and dissipated prolonging the life of each component as a whole, including the blade, hub, and bearing. The subject CHRH construction made from high strength forged steel or medium carbon cast steel, thicker more compact construction with greater hub to bearing outer race contact area and greater hub to blade contact area results in optimal absorption of forces throughout the blade-hub-bearing assembly. These increased contact area interfaces prevent stress loads on the individual components (blade, hub and/or bearing) and therefore prevent loosening of one or more components and thereby the CHRH prevents wobbling and breakage. The subject hub is serviceable as to bearing, bolt or rivet and blade replacement, unlike hubs (such as OEM hubs) or conventional seeding hubs. The subject hub allows multiple bearing designs and applications. The hub may or may not require a hubcap, flat cover, stationary seal cover or internal and/external cover for bearing protection and may be utilized in multiple row unit applications. This cap or cover is preferably made of plastic, steel, silicon, rubber, aluminum or other materials that can withstand the effects of weather and agricultural wear and tear.

Rolling contact bearings are also known as anti-friction bearings due to their low friction characteristics between ball and inner and outer rings or inner and outer races. Rolling contact bearings are used for radial load, axial load and combinations of these loads. Bearings support a shaft or housing to permit their free motion about an axis of rotation. Load can be applied to bearings in either of two basic directions. Radial loads act at right angles to the shaft (bearing's axis of rotation). Axial (thrust) acts parallel to the axis of rotation. When these loads are offset from either the bearing axis (distance St) or radial plane (distance Sr), a resulting moment load (M) will be created. M load=(+−T) (St)+(+−R) (Sr) wherein T is the thrust force, St is the axis of rotation, R is the radial force, and Sr is the radial distance. Rolling contact bearings are often used due to their lower price, less maintenance cost and ease of operation. Rolling contact bearings generally are of two types, including ball bearing and roller bearing. A variety of standard ball and/or roller bearings can be utilized with the subject hub. Bearings utilized include standard bearings, and include bearings such as, but not limited to, deep groove bearings, tapered roller bearings, angular contact ball bearings, self-aligning ball bearings, spherical roller bearings, and wheel hub bearings. For example, deep groove bearings are structured having balls fitted well into deep grooves, enabling the bearings to support axial loads in many directions (including forward and backward directions, as well as up and down) as well as radial loads. Deep groove bearings typically have a single row or double row of balls. Self-aligning ball bearings are structured having two sets of balls which run on a pair of grooves on the inner ring, with a single outer ring concave surface. Wheel hub bearings are manufactured in large quantity annually for needs of the automotive industries and support axial load due to the weight of the automobiles, and radial loads developed when the motion of the automobile is not linear. Standard bearings in the industry typically are constructed having single and double roller groove designed for agricultural full-till applications with lessened side or radial loads. The standard bearings are typically not capable of no-till operations, which have increased down pressure, such as that associated with larger planters and higher speed requirements, which result in increased radial and axial loads.

No-till farming (zero tillage or direct drilling) is a method of growing crops or pasture from year to year without disturbing the soil through tillage. It increases the amount of water that infiltrates into the soil, the soil's retention of organic matter and its cycling of nutrients. In many agricultural regions, no-till farming can reduce or eliminate soil erosion. In addition, the no-till farming technique has been found to increases the amount and variety of life in and on the soil, including disease-causing organisms and disease organisms. One of the most important benefits of no-tillage is improvement in soil biological fertility, making soils more resilient. Additionally, farm operations are made much more efficient, particularly improving sowing time and increased trafficability of farm operations. There are also low-till methods which combine aspects of till and no-till techniques. For example, some approaches may use a limited amount of shallow disc harrowing but no plowing. Despite the growing popularity of no-till framing owing to its advantageous, standard bearings are generally incapable of double disk opener no-till methods because they structurally cannot support the increased down pressure, radial and axial loads, and speeds needed. As a result, they tend to wear and break.

Specialized bearings of the subject invention are contemplated to provide for increased wear and to maintain axial load and increase radial load, and have particular design applications for the subject hub, but may have applications separate from the subject hub. The subject specialized bearing is structured to accommodate no-till operations, but in doing so can also easily handle low till and tillage operations, because the subject bearing structure is structured to dissipate forces resultant from increased down pressure, such as those associated with larger planters and higher speed requirements, which result in increased radial and axial loads. One such bearing includes a gothic-arch bearing angular raise of the groove edge (see FIGS. 7a-7b, herein). Another includes a tapered roller bearing formed having inner and outer rings with rollers tapered in order to simultaneously support axial and radial loads. In these bearings, the ratio of the axial and radial load supported depends on the angle between the roller and bearing axes. Higher angles have been found to support larger radial load, while smaller angles support higher axial loads. Another bearing of the subject invention, having applications optimal with the subject hub, or used as a bearing in other applications, includes angular contact ball bearings constructed to withstand large axial/radial/thrust loads. Still another bearing of the subject invention, having applications optimal with the subject hub, or used as a bearing in other applications, includes spherical roller bearings structured having angular contact between the rollers and raceways. Spherical roller bearings are able to withstand both axial and radial loads.

Tapered-roller-bearings typically have the following features, including 1) used as a set of two (2) in opposite direction or opposing directions; and 2) can maximize radial and axial load applications due to length of roller and race angle. Challenges are size and space requirements, seal designs and cost, will require new theories and tooling. Not applicable to pressed flange hub-bearing assemblies, with lessened outer race contact or outer race contact hub rigidity.

Angular-contact-ball bearings typically maximizes radial loads [double grove and roller] and typically is the preferred bearing design in a single ball and groove or double ball and groove application. By increasing the applicable and correct race and groove angles, radial side loads center the balls in the center of the grooves. This provides more ball to groove contact on both opposing ball and groove angles, thereby maximizing load capabilities and longevity vs. premature bearing failure. The angular contact ball structure of the raised arch, or raised angular edge, is designed to support blade-hub loads, diameter, speed, soil CEC or soil resistance and depth, Residue, and applications. Such angular contact ball structure is not applicable to pressed flange hub-bearing assemblies with lessened outer race contact or outer race contact hub rigidity In accordance with the present invention, the gothic-arch bearing has been redesigned. Applicable and correct race and groove depth and contact area are increased, giving more ball to groove contact on both single ball and groove and double ball and groove applications. This improves opposing ball and groove angles and maximizes load capabilities and longevity with improved seals, metallurgy and lubrication, thereby preventing premature bearing failure. The gothic-arch design increases ball and groove contact area, increasing radial load and axial load capabilities in conjunction with the rigidity of the hub. This redesigned gothic-arch bearing structure is not applicable to pressed flange hub-bearing assemblies, which have lessened outer race contact or outer race contact hub rigidity.

On information and belief, re-designing of a spherical-roller bearing would increase roller to race contact area as to radial and axial loads. Applicable and correct race and groove or multiple surface angles are increased. Radial side loads center the balls or rollers in the center of the groove. Multiple surface angles provide more ball or roller to groove or multiple surface angle contact on both opposing ball or Rollers and groove or multiple surface angle. The re-designed spherical-roller bearing maximizes load capabilities and longevity, thereby preventing premature bearing failure.

One goal of the present invention may include implementation of the CHRH with a coulter blade in turn capable of cutting the soil with a minimum required downward pressure (DP). DP on tillage equipment may be directly proportional to force required to pull the tillage equipment through the field. A reduction in DP equals a corresponding reduction in force and thus, reduced fuel used to pull the equipment. Such a DP reduction can be accomplished through the use of the CHRH with a coulter blade having a plurality of sharpened teeth that are shaped to efficiently cut a substantial portion of stubble. The teeth may be of uniform or variable shape with angular position around the circumference of the blade.

An additional goal of embodiments of the present invention is to provide a CHRH hub that utilizes rigidity to facilitate the use of coulter blades with designed tooth patterns with or without blade inserts. This allows for the mating of like size and different size blades in a matching or offset pattern and produces friction in forward motion as well as a shearing action that increases or decreases rotational speed, of one or both of the paired blades. With this arrangement, there is created a supreme cutting action during tillage of challenging soils and residue conditions.

An additional goal of the embodiments is to uniquely provide a hub that uniquely functions to allow the use of tooth coulter blades that improve planting and seeding environments. The granulation of soil flow from front to back of the blade lessens soil compaction and lessens sidewall compaction, thereby forming a U furrow versus a seed lodging between teeth V furrow effect. This allows excellent soil to seed contact, allowing decreased down pressure requirements of OEM furrow closing devices and/or special furrow closing devices, increasing early root development, and increasing root proliferation. In addition, with this arrangement, rootless corn syndrome and increased brace root development are lessened and/or virtually prevented.

Yet another objective of the subject hub is to prevent or lessen blade flex, thereby preventing the changing of the blade angle and blade engagement and preventing a decreased rotation of the blade and a soil pushing effect. Also prevented are a unit plugging, soil smearing, stubble pushing, and soil compaction effect. Prevention or reduction of blade flex further prevents a narrowing of the seed furrow and lessens the seed lodging effect.

The hub is designed for multiple planter units, seeding units, drills, no-till and conventional, air seeders, closing devices, cutting and harvesting applications and as a universal problem-solving hub. It allows for heavier planters, high-speed planting and seeding devices in multiple and multiple challenging applications such as no-till, moist Bt stubble, high concentrations of stubble. High CEC soils, compact soils, cover and green crops with massive structured root systems, new heavy down pressure systems utilizing hydraulic fluid or air pressure. High-speed planting, increased radial load, rotational side load and impact load on hub flanges, bearings and blades can cause premature failure. For example, regular load=25, high speed may equal=100, high-speed no-till, high CEC or compact soils may=250. Standard hubs are pressed steel or cast which were designed for full till operations with minimum loads and impact requirements.

The subject hub is available in multiple sizes and multiple designs which depend on the specific application. It is a rigid heavy-duty hub preferably made of high strength forging steel and/or medium carbon cast steel, which contributes to lessening of hub flexing, bending, cracking and premature failure. The hub is configured with rigid, heavy duty deep bosses or gussets which increase structural strength and maximize the strength of the attachment points wherein either bolts or rivets attach a blade or object. The configuration of the subject hub maximizes rigid blade to hub area contact, lessens blade flex, blade out of round, blade wobble and blade cracking or premature failure. Bearing outer race contact is maximized, lessening hub flex, blade flex, blade out of round or eccentric, blade wobble and premature bearing failure. The subject hub is concentrated as to size, thereby allowing maximum seeding depth, without depth wheel or depth wheel arm contact. The subject hub is adapted for use with multiple wheel and/or blade configurations including, for nonlimiting example, tooth blades and/or standard blades and/or discs. The bearing can be removed, and the hub used as a driver/power driven hub. Standard blades are contemplated for use with the hub, for agricultural applications including, for nonlimiting example, with equipment for planting sugar cane, fertilizers, closing devices [i.e., seed trench opens a groove and two more fingers go behind and squeeze back together or act as closing devices], row cleaners, opening devices [i.e. opens a groove or row in soil, single or double]. Alternatively, the hub assembly can be utilized in a wheel structure. The hub can be used as a closing wheel/device utilizing bearing structures as discussed herein. Increased hub rigidity is provided by the subject hub, preventing or lessening hub flex causing blade flex, blade out of round or eccentric, blade wobble, blade cracking, contact or friction, and premature blade failure. Additionally, the subject hub construction prevents or lessens premature rivet or bolt cutting, stretching and hub to blade loosening effect.

Maximum hub to blade contact area results from a substantially flush back side fitting and capability for fasteners that facilitate flush fitting of the hub against the blade or implement surface (implement surface being generally a disk-shaped surface having particular, but not necessarily, applications in agriculture). Fastener herein refers to, for non-limiting example, tapered headed cap screws, regular cap screws or rivets, or other types of fasteners contemplated in the art that facilitate a flush mount fit against a surface. Use of 100 degree tapered headed cap screws, regular cap screws or rivets, for non-limiting example, are allowed by the subject hub, creating a maximum hub to blade contact area. For example, a standard fastener, such as regular cap screw or rivet, may have a total blade to hub contact area of [ID& OD] 12.48 mm per bolt or Rivet×6=74.88 mm of total fastener contact area. The CHRH hub, which allows a 100 degree taper headed bolt or rivet, may have a total blade to hub fastener contact area of 18.7 mm per bolt or rivet× 6=112.32 mm of total fastener contact area, or 1.5 or 33% times more fastener contact area]. This increased fastener contact area prevents or lessens bolt or rivet cutting, hub to blade flex, blade out of round or eccentric, blade wobble, bolt or rivet stretch or loosening, blade flex, blade cracking and premature failure.

The subject hub is serviceable, allowing multiple bearing, bolt or rivet, and blade replacements, unlike most original equipment manufacturer ["OEM"] seeding hubs. It allows multiple bearing designs and widths EXP [A single roller 204 or a double roller 204 bearing]. May utilize sealed roller, needle or tapered race bearing or increased size designs. May be grease-able, utilizing alignment or direct path greasing, with or without pressure relief [both are a new concept in the OEM Planting, drills and seeding industry]. The subject hub results in increased hub and bearing longevity and dependability, versus current OEM hubs offering of a single roller bearing and hub or double roller bearing and hub option. The hub may be utilized as the bearing body or outer race with multiple roller designs. The subject hub may or may not require hubcaps. Hubcaps typically fall off or are removed by depth wheel contact in normal or adverse applications.

Multiple row unit applications may be used by the subject hub, such as closing wheels, closing blades, row unit fertilizer application, and closing devices. The subject hub allows for high-speed planting which requires more down pressure and substantially increases radial and rotational forces. Example [regular load=25, high speed may equal=100, high speed no-till, high CEC or compact soils may=250]. It allows for high-speed planting with greater impact loads on fixed objects, such as rocks, etc., due to the more rigid hub and bearing designs. It further allows for increased down pressure forces caused by new designed hydraulic and air systems. Also, due to more rigid hub and bearing designs of the subject hub, it also allows for heavier and wider planters, seeders and air drills, which may concentrate maximum forces on sections of the unit causing premature failure or may concentrate forces in a reverse or rearward motion as to the opposite of designed travel causing premature failure. Wider planters on slopes, waterways, wet spots, uneven surfaces or fields or with markers cause a massive and/or a concentrated massive side load on blade, hub and bearing assemblies. As planters and seeding units increase in size, the leverage length is longer and increases assembly side loads. The CHRH hub utilizes certain high strength forged steel and/or medium carbon cast steel chemistries and processes, which allow for greater rigidity, longevity and dependability in a concentrated size, and is available in multiple sizes and multiple designs for use in a wide variety of applications.

The subject hub is contemplated having various configurations for optimizing coulter blade rigidity and soil engagement, including single side, opposing side, coned, curved, waffle, straight, notched tooth, ripple, turbo, vortex, or multiple blade configurations. Other configurations contemplated include rotating knife, multiple sided, geometrical or tillage apparatus or blade high-pressure tube injection coulter system, and inserted covering finger, multiple teeth at multiple angles, multiple inserts at multiple angles and designs including serrated teeth at multiple angles and configurations. Blades with multiple attachments or devices for insertion, injection or placement are also contemplated.

Further contemplated by the subject hub are applications for blades in seeding; planters, seeders, or seeding systems using ground engagement or attached multiple use placement systems SDS [seed delivery systems]-FDS [fertilizer delivery systems]-MDS [manure delivery systems]-IDS [insecticide delivery systems]-BDS [biological delivery systems]-CEDS [carbon exhaust delivery systems]-TRPDS [transplant delivery systems]-ETRDS [electronic delivery systems].

Other contemplated applications of the subject hub include use in mounting series blades or coulter blades, including use with (i) tillage tools and soil excavation; vertical tillage, disk, fertilizer eq, manure eq, waste eq, mulching eq, plow, sub soil compaction eq, strip till, road construction, excavation eq, tiling, multiple cable laying machine, lawn aeration and fertilization, roto-tillers, insecticide or multiple element placement or injection from gas-solutions-granular and utilizing moist granulated soil sealing capabilities [example—NH3 or carbon exhaust]; (ii) plant and cellulose processing, cutting and harvesting; silage choppers, corn heads, grain heads, pea harvesting heads, hay or cellulose harvesting, hay and cellulose processing [for example, tub grinders-bio-mulching equipment, carbon shredding equipment, aluminum shredding or cutting equipment, poly shredding or cutting equipment, low density elements processing], sickle sections, sugar cane harvesting equipment, row crop header, disk bine, detasselers, food and carbon product processing; (iii) Cutting-shredding; mowers, shredders, brush cutters, tree trimming, stump grinding, woody and plastic processing, polymer processing; and (iv) hand tools and power driven devices; machetes, axes, hatchets, knifes, kitchen utensils, meat grinders and processors, bone grinders, surgical instruments, and military defense.

Additionally, the subject concentrated high-speed rigid hub [CHRH] maintains blade, hub and bearing rigidity, utilizing the PTT STP blade and standard OEM blades as to agronomic benefits and agronomic dependability. The subject hub further prevents or lessons row plugging in challenging applications such as no-till, high CEC soils, compact soils, moist soils, massive root structures such as cover crops or green crops, high speed planting, and conventional tillage. The subect hub furhter establishes rigid blade contact, maintaining rotational driving forces vs blade, hub and bearing flex which lessens rotational driving forces. Furthermore, the subject hub maximizes planting depth in dry soil conditions, heavy deep stubble conditions, moist Bt stubble and maintains dependability in low and high impact applications, such as rocky soil conditions. The subject hum further maintains consistent furrow depth and width. The hub utilizes rigidity, which allows, the use of a coulter blade with designed tooth patterns and allows for the mating of same and different size blades, in a matching or offset pattern. The hub and coulter blade forms an assembly allowing friction in forward motion and shearing action, for increased or decreased rotational speed, of one or both of the paired blades, thereby creating a supreme cutting action in challenging soils and residue conditions. Advantageously, the hub allows the use of a tooth blade [STP] therewith to improve planting and seeding environments as to rotation, granulates soil flow from front to back of the blade, lessens soil compaction, lessens sidewall compaction, forming a u furrow vs a seed lodging V furrow effect, allowing excellent soil to seed contact, allowing decreased down pressure requirements of OEM furrow closing devices and/or special furrow closing devices, increased early root development, and increased root proliferation, and lessening and/or preventing rootless corn syndrome and increased brace root development. Uniquely, the hub prevents or lessens blade flex, which prevents the changing of the blade angle and blade engagement, preventing a decreased rotation of the blade and a soil pushing effect, preventing a unit plugging, soil smearing, stubble pushing and soil compaction effect, preventing a narrowing of the seed furrow and lessening the seed lodging effect.

Figure 2A:
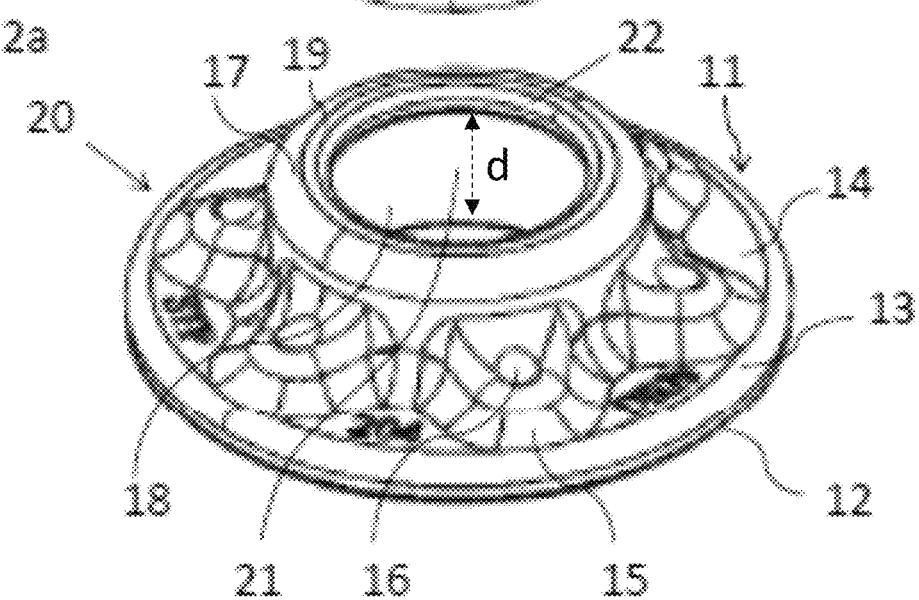
FIG. 2a is a top side view of the hub of FIG. 1.
Figure 2B:
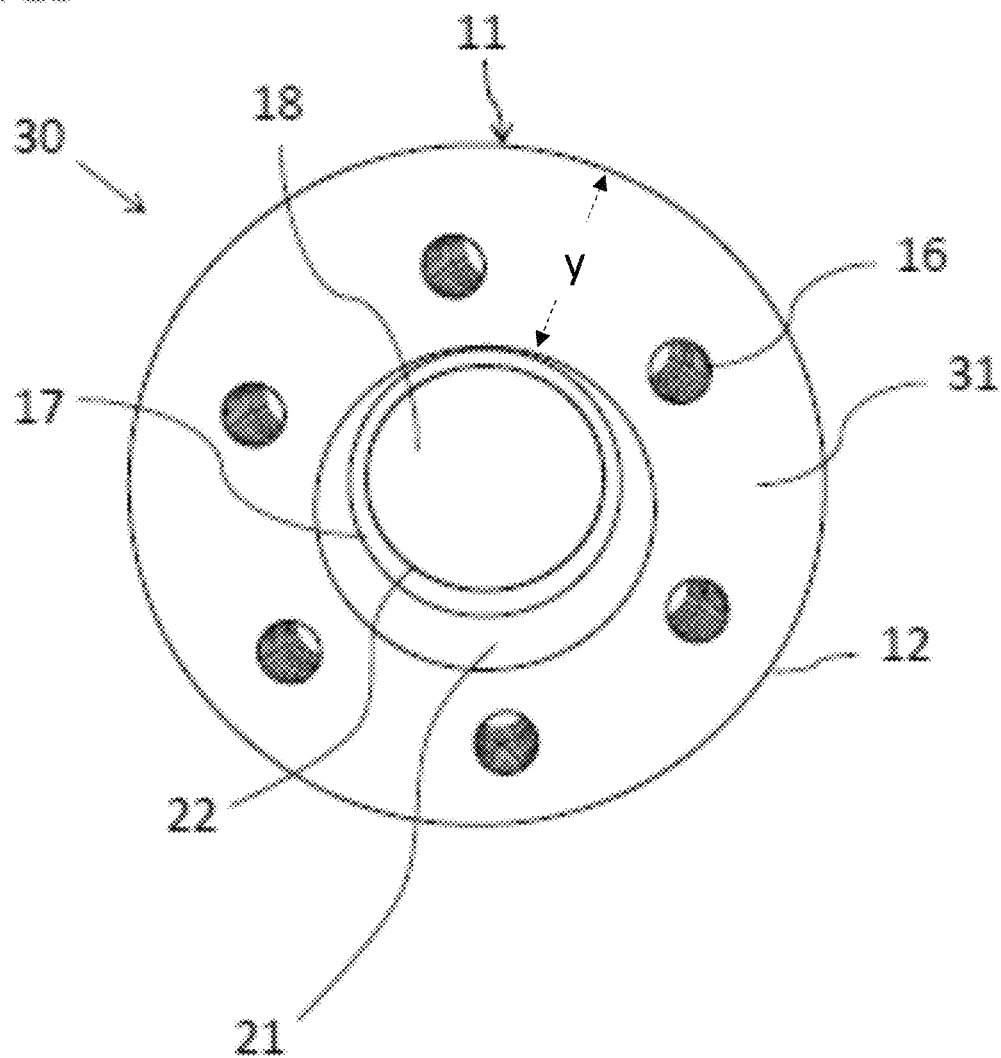
FIG. 2b is a back-side view of the hub of FIG. 1.

FIG. 1 is a top plan view of a hub exemplary of an embodiment of the present invention, shown generally at 10. FIG. 2a is a top side view of the hub of FIG. 1, shown generally at 20. FIG. 2b is a back-side view of the hub of FIG. 1, shown generally at 30.

Referring to FIGS. 1, 2a and 2b, CHRH hub 11 is made of high strength forging steel and/or medium carbon cast steel thereby lessoning hub flexing, hub bending, cracking and premature failure. Hub 11 has narrow circumferential side wall 12 abutting a perpendicularly arranged outer hub rim 13, in turn, abutting a hub top wall 14. Top wall 14 includes integrated rigid, heavy duty deep bosses 15 having cast, cast steel or forged steel threaded apertures 16 for receiving taper bolts (see FIGS. 4a, 4b). Four or more bosses or gussets having one or more of cast steel or forged steel threaded apertures may be provided. More preferably, six or more bosses or gussets are provided. Herein six or more deep individual bosses, or contiguous bosses (bossing collar), are shown. It is noted that the number of bosses can be determined to correspond to mounting apertures within a variety of coulter blades. Rigid, heavy-duty deep bosses 15 preferably have a thickness depth greater than the thickness depth of the side wall 12 and hub rim 13. As a result, cast, cast steel or forged steel threaded apertures 16 have a greater depth than the side wall 12 and hub rim 13 for a thicker threaded surface area in screwing in the taper bolts when mounting on a blade (see FIG. 5a-5c). Deep bosses 15 substantially perpendicularly abut an inner hub rim 17. Inner hub rim 17 has a thickness depth greater than the thickness depth of the bosses 15. Inner hub rim 17 forms bearing housing 18 adapted to receive a heavy-duty double bearing (see FIGS. 3a, 3b) therein (see assembly, FIG. 5c). The heavy-duty double bearing design offers an improvement for use in planting and seeding. The improved bearing is designed to fit flush within bearing hub wall 21 of bearing housing 18 for an increased depth surface area interaction or contact of the bearing hub wall 21 with the bearing outer race when it is housed therein for a larger than the typical amount of surface area interaction. The hub facilitates maximum blade to bearing contact area and maximum blade to hub contact area producing hub and blade longevity.

Inner hub rim 17 may or may not include a threaded edge 19 for receiving a machine bushing (not shown), threaded cap, non-threaded cap, or externally attached cap upon full mounting assembly on agricultural equipment. Bearing housing 18 is formed with circumferential bearing hub wall 21 that extends from a top rim 22 (which may or may not be formed having the threaded edge 19) to the back side wall 31 (see FIG. 2*b*) of the hub 11 for a depth d for a great depth surface area interaction of the hub 11 with the intended bearing outer race when it is housed therein. As such, the bearing hub wall provides a substantial amount of bearing outer race hub surface area interaction. The rigid heavy-duty hub 11, with deep bosses 15 provides a maximum blade and bearing contact area, in a concentrated size, configured for maximum seeding depth without depth wheel or arm contact. As best viewed by way of FIG. 2*b*, rigid heavy-duty hub's 11 back side wall 31 is substantially flat, flush or planar preferably without grooves or openings (other than threaded apertures 16) so that the back-side wall 31 is mounted substantially flush against the coulter blade/or blade or disc surface for optimal blade hub surface area interaction. That is to say, preferably back side wall 31 does not have surface plane interruptions (i.e., indents, grooves, furrows, or other surface plane disruptions), and thus substantially the entire surface area of the back-side wall 31 of the hub 11 mounts flush against the blade, thereby maximizing blade hub (back side wall 31) surface area contact. Back-side wall 31 has a ring surface area/ring radius y. Back-side wall 31 having ring radius y is appointed to be mounted flush against the blade via a corresponding area on the blade equal to y. The greater the ring radius y, the greater the contact surface interface area of the hub to the blade.

Figure 3A:
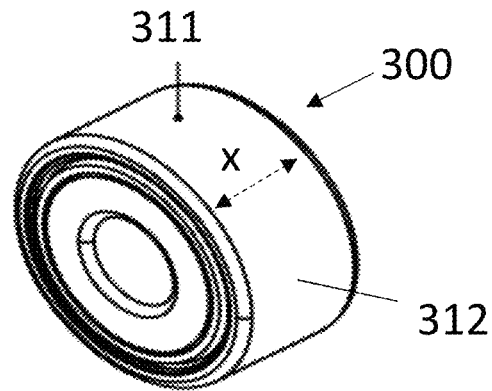
FIG. 3a is top side view of an embodiment of a heavy-duty double roller for use with the hub of the present invention.
Figure 3B:
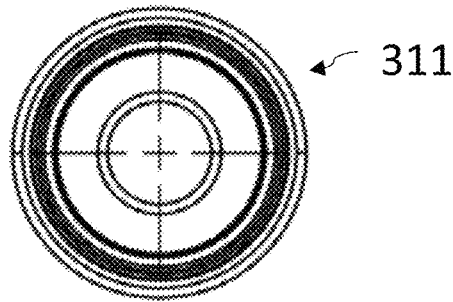

FIG. 3*a* is a top side view of a heavy-duty double bearing exemplary of an embodiment for use with the hub of the present invention, shown generally at 300. FIG. 3*b* is a top plan view of the heavy duty double roller bearing of FIG. 3*a*. Referring to FIGS. 3*a*-3*b*, heavy duty double roller bearing 311 is received within the roller bearing housing of the hub providing maximum blade and roller bearing outer race 312 contact area when the blade is mounted. Bearing outer race 312 has a depth x corresponding to the depth of the roller bearing housing's bearing hub wall (x in FIG. 2*b*), so that bearing outer race 312 sits flush within the bearing hub wall of bearing housing for an optimal depth surface area interaction or contact area between the bearing hub wall and the bearing outer race 312. This results in maximum blade/hub to bearing contact area for hub and blade longevity. Bearing herein refers generally to a machine element that constrains relative motion to only the desired motion and reduces friction between moving parts. Bearing herein generally refers to, for non-limiting example, rolling-element bearings (including for example, ball bearings, roller bearings, and needle bearings, etc.) and plain bearings (including for example, bushings and sleeve bearings, etc.). Typically, roller-element bearings are constructed having an inner ring or inner race that rotates, rolling elements (for example, spherical balls or cylindrical rollers), and outer ring or outer race 312 that remains stationary.

Figure 4A:
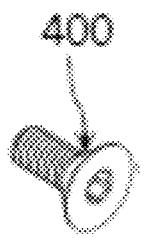
FIG. 4a is a top side plan view of a fastener, herein generally shown as a taper bolt, exemplary of an embodiment for use with the hub of the present invention.
Figure 4B:

FIG. 4*a* shows a top side view of a fastener, herein shown as a taper headed bolt exemplary of an embodiment for use with the hub of the present invention, shown generally at 400. FIG. 4*b* is a side view of the taper headed bolt of FIG. 4*a*. Referring to FIGS. 4*a*-4*b*, a taper headed bolt is received within cast, cast steel or forged steel threaded apertures of the bosses of the hub when securing the hub to the coulter blade and mounting it on agricultural equipment. It is noted that although a taper headed bolt is shown, for example, other types of fasteners are contemplated including for non-limiting example, tapered headed cap screws, regular cap screws or rivets, or other fasteners utilized for creating a substantially flush contact against the receiving surface, i.e., such as disc blade, etc.

FIG. 5*a* is a top side view of a coulter blade, STP opener blade left side, exemplary of an embodiment for use with the hub of the present invention. FIG. 5*b* is a top view of the coulter blade of FIG. 5*a*. FIG. 5*c* is a top side view of full assembly an exemplary embodiment of the hub of the present invention mounted on the coulter blade of FIG. 5*a*, shown generally at 500. Hub 511 is assembled on blade 550 for mounting on agricultural equipment, such as a tillage machine capable of mounting and operating many coulter blades. Hub 511 includes rigid, heavy duty deep bosses having cast or forged threaded or non-threaded apertures 516 for receiving taper headed bolts, tapered headed cap screws, regular cap screws or rivets (see FIGS. 4*a*, 4*b*). Bearing housing 518 of hub 511 receives a heavy duty double roller bearing 540 (see FIGS. 3*a*, 3*b*) therein. The rigid heavy duty hub 511 provides a maximum blade and bearing outer race contact area, in a concentrated size, configured for maximum seeding depth without depth wheel or arm contact. Optionally, a hub cap/cover 545 having a groove/track may be provided to cover roller bearing 540/ hub roller bearing housing. The cap/cover 545 is appointed to be snapped or placed within a mating groove/track on the top edge of the roller bearing housing to cover the roller bearing 540.

It is contemplated herein, that the size of the hub may be designed for specific blade sizes which, in turn, may be designed for a specific type of soil to provide an operator with the flexibility to attain the desired till and aeration. It is noted that although a coulter blade having teeth is shown, the subject hub can be utilized for a plethora of blades and discs without departing from the scope of the invention. A first operator tilling a first specific type of soil may desire a coulter blade having a specific size, shape, teeth size and length, with or without inserts of a blade while a second operator tilling a second specific type of soil may desire a second size, shape, and angle of insert. As the angle of soil entry of each tooth of the blade may be altered by the soil depth at which the coulter blade is operated, the subject hub is of a compact diameter that it does not interfere with, but preferably retains above the blade soil depth. As used herein the term inserts may include, for non-limiting example, 3D integrated/punch-bubble pressed, or inserted appendages in a blade.

Other applications for use of the subject hub are contemplated aside from disc planters, including for non-limiting example, seeders, [present or future] planters and other types of agricultural equipment utilizing disc or blade type implements for soil movement or interaction. The size of the hub is thus changed in proportion to the change in size of the disk or blade. For example, air seeders, [present or future] planters having different size requirements are contemplated for use with the subject hub by modifying the size of the hub corresponding with the size of the disc or blade of the agricultural machinery. The subject hub size is increased proportionally to adapt to applications. Parameters that would vary include, for example, larger diameter hubs for larger blade requirements. Typically, for example, a typical hub is roughly four inches in diameter for a typical blade of roughly sixteen inches. The subject hub is constructed to be lesser in diameter, yet thicker at the blade hub, and bearing hub interfaces. The subject hub preferably has a diameter of approximately 3.8 inches, decreased by approximately 0.4 inches, thus reducing the hub-blade diameter ratio (diameter 3.8" (hub), 16" (blade)). Reduced blade hub ratio or reduced size ratio of hub proportionately to the blade is achieved by way of the subject hub, while increased fastener contact area results are owing to the planar substantially flat back side of the hub, and increased thickness overall giving greater strength and rigidity. For example, the planar back side of the hub has been found to increase the back side hub-blade surface area interaction by approximately 25%. The subject hub further includes bosses to enhance the stability of the hub bearings. Moreover, the decreased hub diameter results in the blade being capable of entering the soil deeper while preventing the hub from hitting against the agricultural machinery's depth wheel and/or depth wheel arm Gussets may be used instead of bosses. Gusset herein generally means brace or support, such as a collar, plate or bracket for strengthening an angle in the framework. Boss herein generally means a protuberant or raised part thrusting out from a surrounding or adjacent surface often as a rounded mass. Generally, a gusset may be wider or flatter, whereas when a boss is used the aperture preferably has deeper threads (increase thread depth). The subject hub may include gussets and/or bosses. The backside of the hub sits flush against the blade.

Figure 6A:
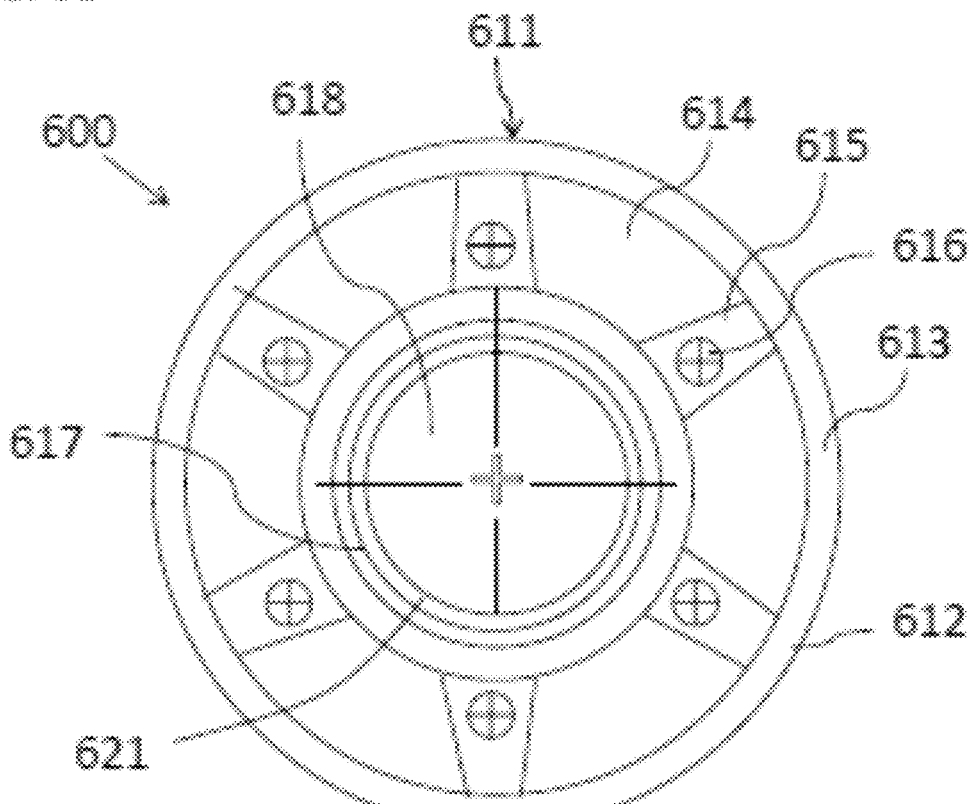
FIG. 6a is a top front side plan view of a hub exemplary of an embodiment of the present invention.
Figure 6B:
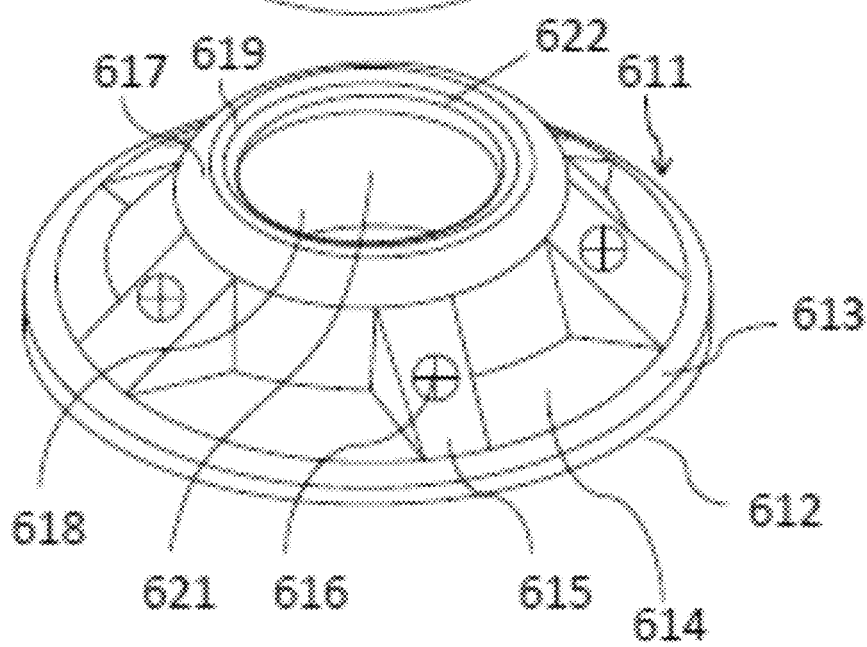
Figure 6C:
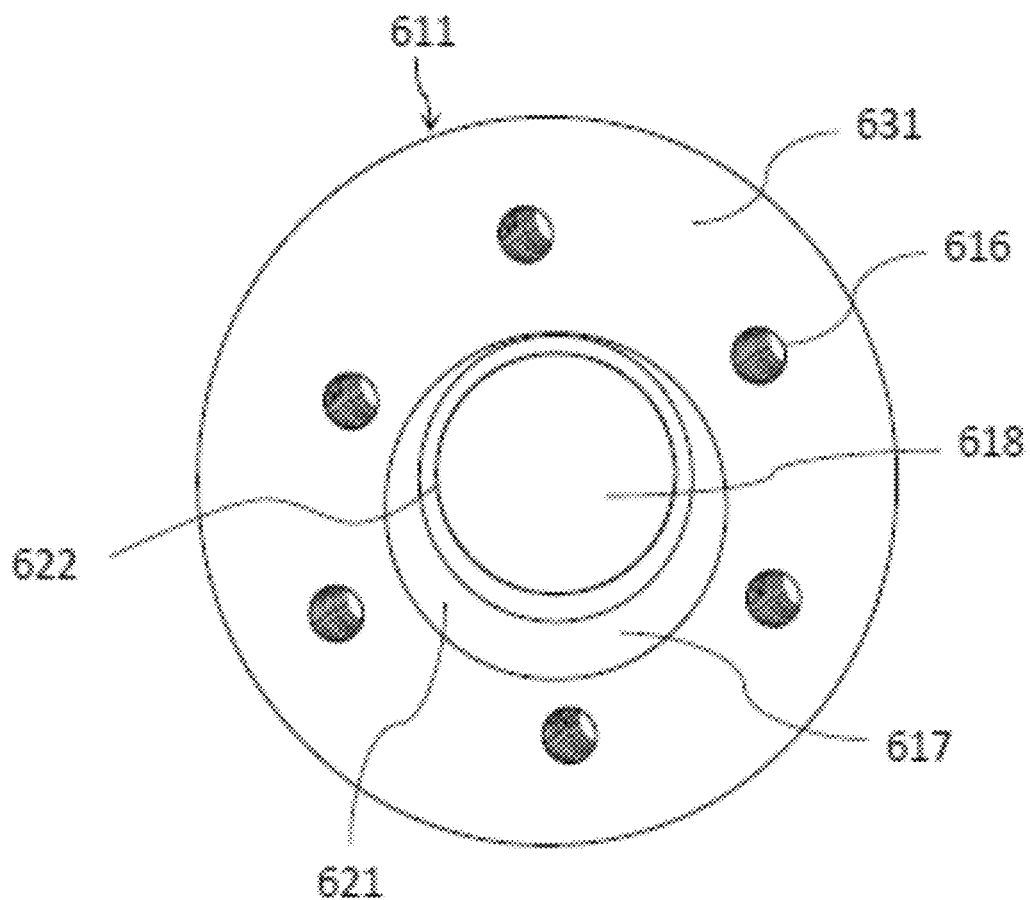

FIG. 6a is a top front side plan view of a hub exemplary of an embodiment of the present invention, shown generally at 600. FIG. 6b is a side plan view of the hub of FIG. 6a. FIG. 6c is a back side plan view of the hub of FIG. 6a.

Referring to FIGS. 6a-6c, the CHRH hub 611 is made of high strength forging steel and/or medium carbon cast steel, thereby lessening hub flexing, hub bending, cracking and premature failure. Hub 611 has narrow circumferential side wall 612 abutting a perpendicularly arranged outer hub rim 613, in turn, abutting a hub top wall 614. Top wall 614 includes integrated rigid, heavy duty deep gussets 615 and cast steel or forged steel threaded apertures 616 for receiving fasteners (tapered headed screw, standard screw, rivet, etc.). Four or more bosses or gussets may be provided. More preferably, six or more bosses or gussets are provided. Herein six or more deep individual gussets, or contiguous gussets (collar), are shown. It is noted that the number of gussets can be determined to correspond to mounting apertures within a variety of coulter blades. Rigid, heavy-duty deep gussets 615 preferably have a thickness depth greater than the thickness depth of the side wall 612 and hub rim 613. Deep gussets 615 substantially perpendicularly abut an inner hub rim 617. Inner hub rim 617 has a thickness depth greater than the thickness depth of the gussets 615.

Inner hub rim 617 forms bearing housing 618 adapted to receive a heavy duty double bearing (see FIGS. 3a, 3b) therein (see assembly, FIG. 5c). Inner hub rim 617 may or may not include a threaded edge 619 for receiving a machine bushing (not shown), threaded cap, non-threaded cap, or external attached cap upon full mounting assembly on agricultural equipment. Bearing housing 618 is formed with circumferential bearing hub wall 621 that extends from a top rim 622 (which may or may not be formed having the threaded edge 619) to the back side wall 631 (see FIG. 6c) of the hub 611 for a great depth surface area interaction of the hub 611 with the intended bearing housed therein. As such, the bearing hub wall provides a substantial amount of bearing outer race hub surface area interaction. The rigid, heavy duty hub 611, with deep gussets 615 provides a maximum blade and bearing contact area, in a concentrated size, configured for maximum seeding depth without depth wheel or arm contact. As best viewed by way of FIG. 6c, rigid heavy duty hub's 611 back side wall 631 is substantially flat, flush or planar preferably without grooves or openings so that the back side wall 631 is mounted substantially flush against the coulter blade/or blade or disc surface for optimal blade hub surface area interaction.

The subject hub and hub assembly can be used for a variety of blades, including for non-limiting example, flat planar blades, serrated blades, and/or concave coulter blades.

It is to be understood that although herein a bearing is discussed, rather than a bearing the subject hub can receive a rotating shaft without departing from the scope of the subject invention. For example, no rotation on the bearing is used for agricultural rotors for harvesting, cutting, sizing and mowing. The subject hub can be utilized, just with a shaft being used instead of the bearing.

Figure 7A:
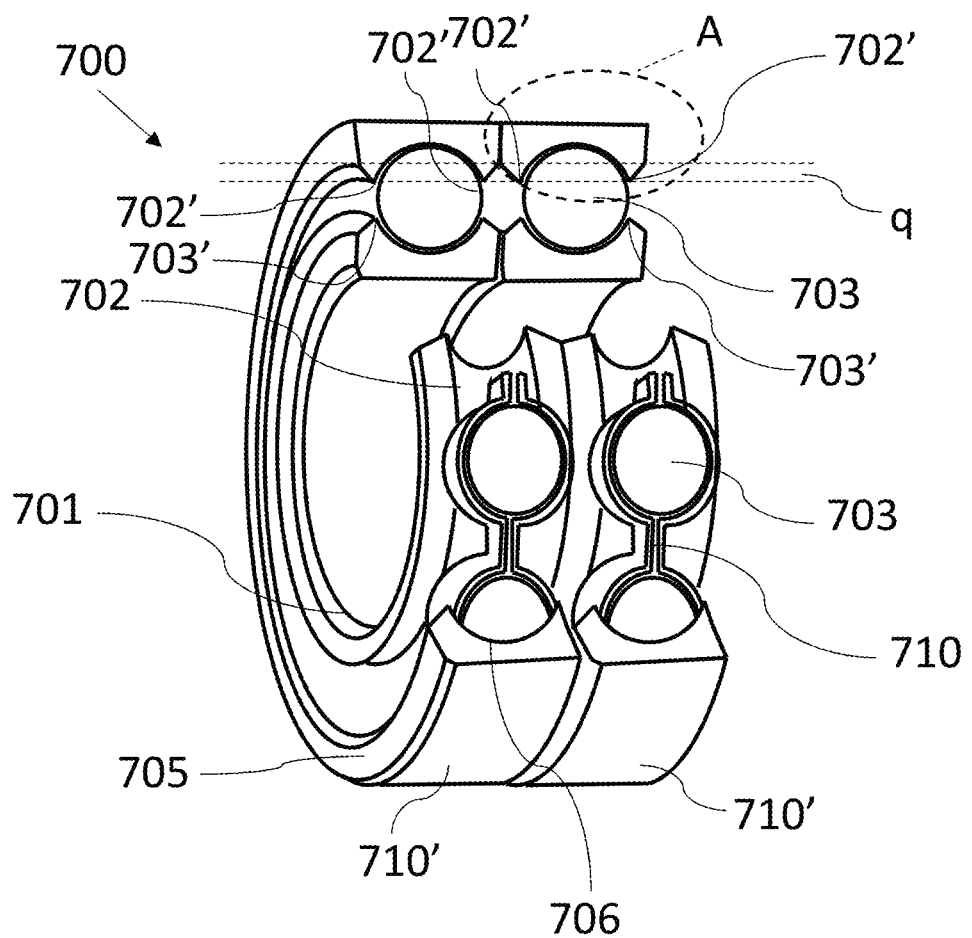
FIG. 7a illustrates a cross-section top plan view of an embodiment of a gothic-arch ball bearing constructed to withstand a large axial load in a single direction, in addition to radial loads.
Figure 7B:
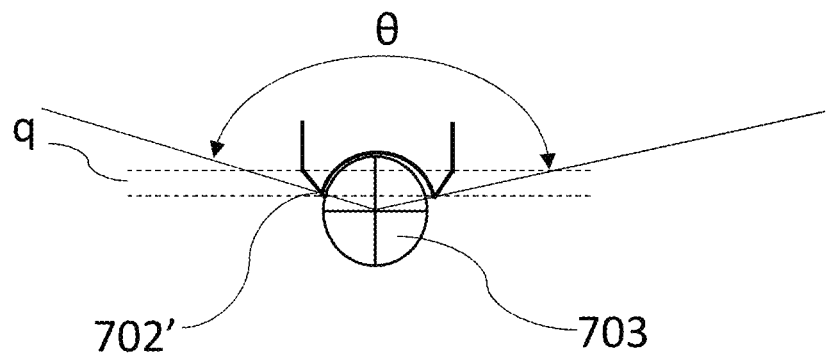
FIG. 7b illustrates a cross-section A taken from FIG. 7a, showing the angular raise of the groove edge.

FIG. 7a illustrates a cross-section top plan view of an embodiment of a Gothic-arch ball bearing constructed to withstand a large axial load in a single direction, in addition to radial loads, shown generally at 700. FIG. 7b illustrates a cross-section A taken from FIG. 7a, showing the angular raise of the groove edge. The gothic-arch ball bearing 700 has particular applications for use with the subject hub, but may be used for other applications. The subject gothic-arch ball bearing 700 is constructed to withstand a large axial load in a single direction, in addition to radial loads. Bearing 700 includes an inner ring or race 701 having a groove 702 on its outer diameter to form a pathway for bearing balls 703. The surface of outside diameter path of inner ring or race 701 is finished to tight tolerances and is honed to a very smooth surface. Inner ring 701 is appointed to be mounted on a shaft and acts as a rotating element. An outer ring 705 is located proximal to inner ring 701 and includes a corresponding groove 706 on its inside diameter to form a pathway for balls 703. The outer ring surface of groove 706 has the same high precision finish of the inner ring 701. The outer ring 705 is usually held stationery.

Bearing balls 703 are rolling elements that separate the inner ring 701 and outer ring 705 and permit the bearing to rotate with minimal friction. The radius of the ball 703 is made slightly smaller than the grooved ball track/groove 702 and 706 on the inner and outer rings. Ball 703 dimensions are controlled to very high accuracy, as well as ball roundness, surface finish, and size variations. A retainer 710 is provided to separate the balls and maintain a constant spacing between the inner and outer rings, 701 and 705, to accurately guide the balls in the path during rotation and prevent the balls from falling out. Lubrication is typically added to reduce friction losses in the bearing.

In the embodiment shown, each groove 702 and 706, include angular raised groove arched edges, 702' and 706', respectively. Angular raised groove edges 702' and 706' are located on all edge walls of grooves 702 and 706 and extend a distance q from the side plan walls of each of the inner and outer rings, 701 and 705 so that the pathway trackballs 703 travel on has increased area contact via distance q on the surface of the ball 703. It has been found that the raised groove edges 702' and 706' by way of distance q provides two raised arched edges that result in an increase in contact are for supporting greater radial loads. Typically, angular ball bearings are not used in seeding industries, yet it has been found that use of the subject bearing with the subject hub maintains axel load and increases the radial load. It is noted that, as shown, the subject bearing is a double roller, 710' and 710" for sufficient strength and metal wear. It is noted that although the bearing shown is a gothic-arch bearing, the subject raised edge configuration can also be implemented in other roller bearings like, for nonlimiting example, tapered roller bearings.

The subject raised edges and double bearings provide increased side loads and size limitations, particularly adapted for applications wherein the Ag blade/disc is not aligned with soil, i.e., any application wherein the blade is sideways. The configuration also allows for greater speed applications, as the speed doubles the load, as well as applications with different soil types and blade to soil alignment considerations. Several characteristics can vary, including, the number of ball bearings, the size of ball bearings, the distance from race to race, and the depth of the groove. In keeping these variables constant, the angle of coverage θ is a function of distance q/height of the angular arched edge. The angle of coverage θ, determined from the center of the ball 703 and is a function of distance q, as distance q increases, the angle of coverage θ increases. Accordingly, the >distance q; the >angle of coverage θ. This increased angle of coverage θ from traditional bearings results in free turning of the ball with the least amount of drag while providing increased radial load by increasing the surface area of coverage.

Specific blocks, sections, devices, functions, processes, and modules may have been set forth. However, a skilled technologist will realize that there are many ways to partition the system and that there are many parts, components, processes, modules or functions that may be substituted for those listed above.

While the above-detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The preceding description details certain embodiments of the invention. It will be appreciated, however, that no matter how detailed the preceding appears, the invention may be embodied in other specific forms without departing from its spirit or essential characteristics. The described embodiment is to be considered in all respects only as illustrative and not restrictive, and the scope of the invention is, therefore, indicated by the appended claims rather than by the preceding description. All changes which come within the meaning and range of equivalency of the claims are to be embraced within their scope.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for the sake of clarity.

The herein described subject matter sometimes illustrates different components contained within, or connected with, different other components. It is to be understood that such depicted architectures are merely exemplary and that many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedia components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components unless the context requires otherwise.

While particular aspects of the present subject matter described herein have been shown and described, it will be apparent to those skilled in the art that, based upon the teachings herein, changes and modifications may be made without departing from the subject matter described herein, and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A concentrated high-speed rigid hub (CHRH), the CHRH configured for coupling a coulter blade to an implement via a bearing, the CHRH having an inner hub rim within and concentric with an outer hub rim, each of the inner and outer hub rim concentric about an axis of rotation, an inner hub rim radius and an outer hub rim radius perpendicular to the axis of rotation, the inner hub rim associated with a bearing housing having a depth (d) parallel with the axis of rotation, the outer hub rim having a side wall depth parallel with the axis of rotation, the side wall depth substantially less than the bearing housing depth, the bearing housing configured to receive the bearing;

the CHRH including at least four bosses, each one of the at least four bosses associated with a threaded aperture adapted for receiving a fastener, each boss of the at least four bosses configured for: 1) providing a thread depth associated the threaded aperture, the thread depth greater than the outer hub rim depth and less than the bearing housing depth, 2) transferring each of a radial load and an axial load between the outer hub rim to the inner hub rim, and 3) providing a structure surrounding the threaded aperture;

the CHRH having a back side wall opposite, along the axis of rotation, from the at least four bosses, the back side wall having a ring surface area defined by a ring radius ($\gamma$) perpendicular to the axis of rotation, the ring surface area substantially planar enabling the back side wall contact with the coulter blade;

the CHRH functions to 1) receive the fastener, as inserted through an associated coulter blade aperture and threaded within the threaded aperture of each of the at least four bosses, 2) couple the coulter blade to the CHRH via the back side wall, 3) secure the bearing within the bearing housing, and 4) couple the coulter blade to the implement via the bearing with no additional structure.

2. The CHRH of claim 1, wherein a ratio of outer hub rim radius to inner hub rim radius is approximately a range of 2.0 to 3.0.

3. The CHRH of claim 1, wherein a ratio of the depth of the bearing housing to the depth of the outer hub rim is approximately a range of 3.0 to 5.0.

4. The CHRH of claim 1, wherein the CHRH is comprised of one of: a high strength forged steel and a medium carbon cast steel.

5. The CHRH of claim 1, wherein the CHRH is configured to receive a fastener comprising a one-hundred degree taper headed tap fastener.

6. The CHRH of claim 1, wherein said back-side wall does not have a surface plane interruption allowing a flush mounting between said coulter blade and said back side wall.

7. The CHRH of claim 1, wherein said bearing housing depth d is sized to receive an outer race of the bearing, the outer race having a depth x, wherein d=x maximizing an outer race contact with the bearing housing.

8. The CHRH of claim 1, wherein the bearing depth d is sized to prevent a contact between the CHRH and one of an implement depth wheel and an implement depth wheel arm.

9. The CHRH of claim 1, wherein the CHRH is configured for transferring the axial load from the coulter blade to the implement based on 1) a configuration of the at least four bosses and 2) the ring surface area contact with the coulter blade.

10. The CHRH of claim 1, wherein the thread depth associated with each threaded aperture is approximately 0.3 to 0.7 of the bearing housing depth d.

11. The CHRH of claim 1, wherein the threaded apertures are comprised one of a cast steel and a forged steel.

12. The CHRH of claim 1, wherein said CHRH is configured to receive a plurality of bearing designs and a plurality of bearing widths and bearing outside diameters.

13. The CHRH of claim 1, wherein said CHRH further comprises a hubcap.

14. The CHRH of claim 1, wherein said CHRH is configured to support a coulter blade used in a plurality of designs of agricultural equipment.

15. The CHRH of claim 1, wherein said CHRH is configured for transferring each of the radial load and the axial load associated with one of a high-speed planting application, a no-till application, an application within one of: a high cation exchange capacity soil, a compact soil, a moist soil, a cover crop and a green crop.

16. The CHRH of claim 1, wherein said CHRH is configured for transferring each of the radial load and the axial load associated with an impact on a fixed object.

17. The CHRH of claim 1, wherein said CHRH is configured for transferring each of the radial load and the axial load associated with down pressure forces caused by one of a hydraulic and an air down pressure tillage equipment.

18. The CHRH of claim 1, wherein said CHRH is configured for transferring each of the radial load and the axial load associated with one of a planter, a seeder and an air drill.

19. The CHRH of claim 1, wherein said CHRH is configured using one of a forged steer, a cast steel and a tooling steel providing a rigidity, a longevity, and a dependability in a concentrated size.

20. The CHRH of claim 1, wherein the CHRH is further configured to receive a coulter blade designed with one of a standard coulter blade, a disc blade and a tooth pattern.

21. The CHRH of claim 20, wherein said CHRH is configured for transferring each of the radial load and the axial load associated with one of: a coulter blade friction in a forward motion and a shearing action of the coulter blade.

22. The CHRH of claim 1, wherein said CHRH is configured for transferring each of the radial load and the axial load preventing at least one of: a blade flex, a changing coulter blade angle, a coulter blade soil engagement, a decreased rotation of the coulter blade, a soil pushing effect, a unit plugging, a soil smearing, a stubble pushing, soil compaction effect, a narrowing of a seed furrow, and a seed lodging effect.

23. The CHRH of claim 12, wherein the plurality of bearing designs further includes one of: a deep-groove bearing, an angular bearing, a spherical bearing, a gothic-arch bearing, and a tapered bearing, each of said bearing designs having a grooved inner ring and a grooved outer ring configured for transferring each of the radial load and the axial load between an inner race of the bearing and an outer race of the bearing.

* * * * *